United States Patent Office
3,336,142
Patented Aug. 15, 1967

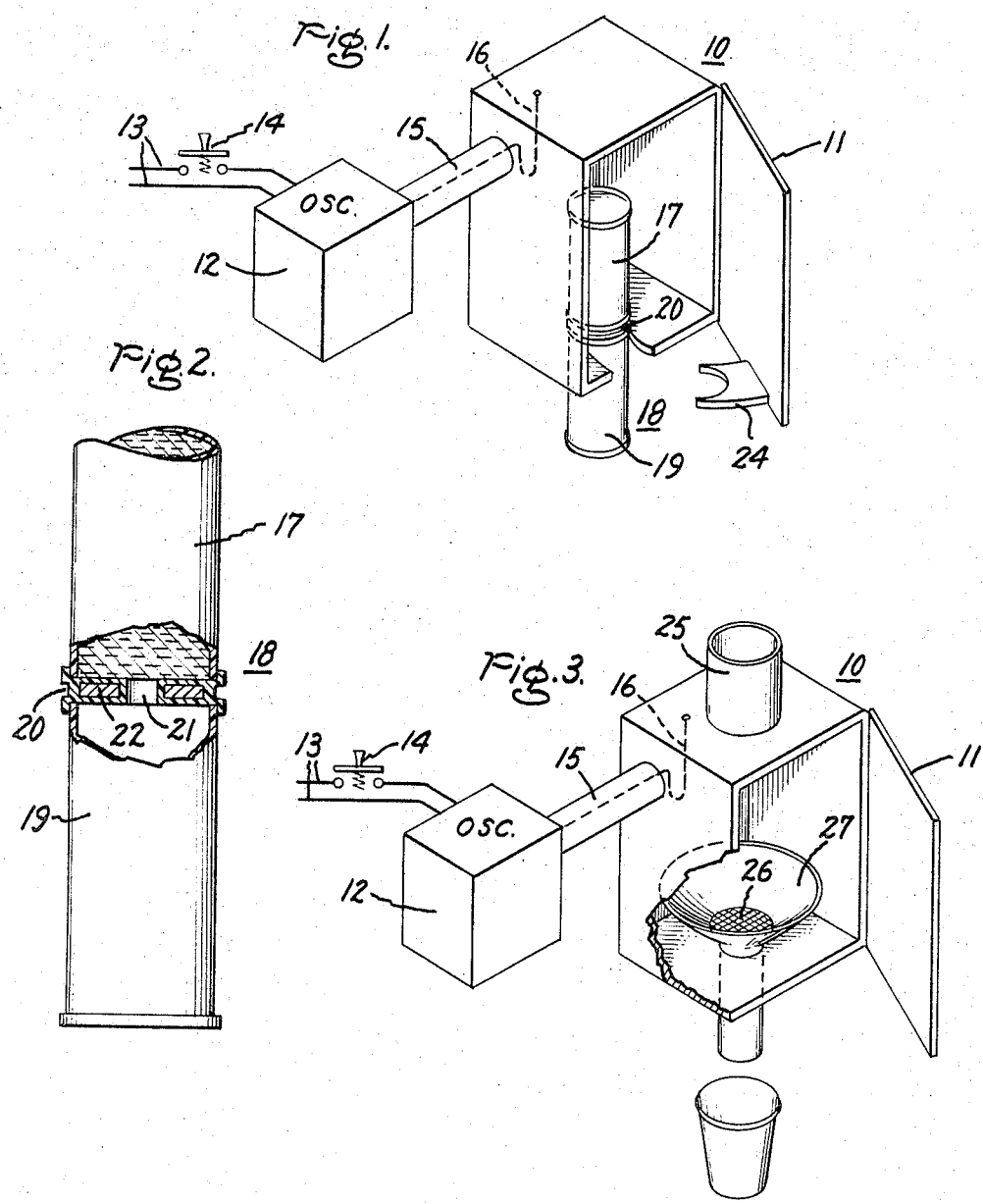

3,336,142
METHOD AND APPARATUS FOR MELTING FROZEN LIQUIDS
James L. Lawson, Schenectady, N.Y., assignor to General Electric Company, a corporation of New York
Filed Oct. 22, 1965, Ser. No. 502,268
7 Claims. (Cl. 99—192)

ABSTRACT OF THE DISCLOSURE

This invention provides a method and apparatus for thawing frozen liquid (juice and the like) and a container for use therein by subjecting the frozen liquid to high frequency electromagnetic energy and continually withdrawing the thawed liquid from the region subjected to the field to eliminate the preferential absorption of energy by the liquid to hasten the thawing and eliminate overheating of the liquid.

The present invention relates to an improved method and apparatus for melting frozen liquids, and particularly for melting frozen juices which are to be served cold.

High frequency electromagnetic heating apparatus for cooking food has been the subject of substantial development in recent years, and such equipment is commercially available as electronic ovens, radar ranges, and the like. Also, considerable interest has developed in thawing of frozen juices which are to be served cold. The direct application of the high frequency heating apparatus to the thawing of frozen juices has not proven wholly satisfactory. A quantity of frozen juice placed in a high frequency cooker tends to result in a mixture of overly warm liquid and residual frozen juice. If heating is terminated before the frozen juice is completely melted, a satisfactory equilibrium temperature can be reached by allowing the continued melting to cool the over-heated liquid. The time required for this to be accomplished, however, is substantial and is totally incompatible, for example, with equipment for promptly supplying a quantity of cold juice from a supply of frozen juice.

In accordance with an important aspect of my invention, the frozen liquid is subjected to a high frequency electromagnetic field and the liquid removed from the region of the field as fast as it is produced by melting. This eliminates the preferential heating of the liquid and permits the efficient continued melting of the frozen juice, while retaining the melted liquid outside the electromagnetic field and at a cool temperature suitable for consumption. Since only the frozen juice remains within the electromagnetic field, it presents a much more constant electrical impedance than would a mixture of liquid and frozen juice and, accordingly, simplifies the problem of coupling electromagnetic energy from the high frequency source to the frozen juice.

Accordingly, it is an important object of my invention to provide improved apparatus and method for producing cool, melted liquid from a supply of frozen liquid.

Another object of my invention is to provide an improved method and apparatus for melting frozen juices which are suitable for application to dispensing apparatus.

Further objects and advantages of my invention will become apparent as the following description proceeds, reference being had to the accompanying drawing, and its scope will be pointed out in the appended claims.

In the drawing:

FIG. 1 is a three-dimensional view of high frequency heating apparatus embodying my invention and suitable for carrying out the method of my invention;

FIG. 2 is a partial elevational view, partially broken away, showing a container suitable for use in my invention; and FIG. 3 is a three-dimensional view of a modification of the apparatus shown in FIG. 1.

In the drawing, I have shown my invention as embodied in a method and apparatus particularly suited for melting frozen juice which is to be served cold. In the embodiment shown in FIGS. 1 and 2, frozen juice is stored in one part of a two-part container, the second part forming a receptacle for the liquid as it is melted.

Referring now to FIGS. 1 and 2, I have shown a high frequency electromagnetic oven 10 in the form of a generally rectangular enclosure of conducting material closed on the front by a door 11. Electromagnetic wave energy is supplied to the interior of the oven by means of an oscillator 12 energized from a suitable supply line 13 under the control of a switch 14, and the output of which is coupled to the interior of the oven by a concentric transmission line 15 having the internal conductor terminating in a loop 16 conductively connected to one wall of the oven and forming an inductive coupling with the oven.

As shown in FIG. 2, the juice to be stored in a frozen condition and then melted for consumption is preferably contained in one part 17 of a two-part container 18, the second part 19 of which provides a receptacle for the liquid when it is melted. The material of the container is non-conducting so as not to provide an electromagnetic shield and may be of paper suitably treated, or one of the many plastics used for packaging foodstuffs. In accordance with the preferred construction of the container, it is provided with a restriction or surrounding groove 20 at its midsection, i.e., at the boundary between the two parts of the container. Also, this boundary preferably provides a restricted passage 21 for the melted liquid to flow into the empty half of the container when it is melted. It will be understood that several passages may be provided if desired. If the transverse dimension of the package is too large at the restricted region so that high frequency energy may tend to escape from the enclosure providing the oven, an electromagnetic shielding member in the form of a conducting washer 22 may be molded into the package.

Referring again to FIG. 1, it will be noted that the floor of the oven is provided with a slot 23 for the reception of the restricted portion of the container so that the container is supported with the frozen liquid within the oven and the liquid receiving portion outside of the oven. A sheet metal closure member 24, attached to the door, moves into the slot in the oven floor to complete the oven enclosure after insertion of the container. It will be apparent that, in the operation of the apparatus described above in accordance with my invention, the container with the frozen juice at one end is inserted in the oven and the shield 24 moved into position as the door is closed. The switch 14 is then closed and electromagnetic energy which, in accordance with present practice, would be in the frequency range 900 to 3000 megacycles, is generated and coupled to the oven. In the particular embodiment shown, the oven is designed to have a transverse dimension of one-half wavelength, so that the maximum electric field exists at the central region of the oven in the vicinity of the frozen juice. As the frozen juice starts to melt, the liquid is immediately drained into the lower portion of the container and the overheating of the liquid which tends to result from the preferential absorption of energy by the liquid when it is all maintained within the oven is prevented. It should be pointed out here that the heating of the frozen portion of the juice is essentially dielectric heating and the heating of the melted juice is essentially conductive heating, giving a preferential heating for the liquid about a hundred times that of the frozen or solid juice. Also, this method minimizes the variation in load impedance presented by the juice as it melts, since the liquid is removed and the impedance is determined by the frozen material. This facilitates proper coupling of the energy from the oscillator to the frozen juice.

In FIG. 3 is shown a modification of my invention in which no special container is employed for the frozen juice and quantities of frozen juice from conventional metal cans or other supply may be dispensed into the oven from the top and the juice drained from the bottom as it is formed. In FIG. 3 parts correspond generally to those in FIG. 1 and the corresponding parts have been designated by the same reference numerals. In the modification shown in FIG. 3 it is assumed that the frozen juice is inserted through a tubulation 25 extending upwardly from the central portion of the upper wall of the oven. This tubulation has a length which is at least as great as the transverse dimension thereof so that the electromagnetic field escaping from the opening is limited. Also, the floor of the oven is provided with one or more drainage openings 26 defined by the metal of the oven floor in a central region thereof. The drainage openings 26 are surrounded by an insulating collar 27 which provides a retainer for the frozen liquid and guides the melted liquid to drain it from the oven. If the drainage openings are formed in the conducting metal which forms the electromagnetic shield, it will be readily apparent to those skilled in the art that no significant high frequency energy escapes from the interior of the enclosure by way of these openings. The juice may be collected in a suitable receptacle 28 positioned below the oven, where it is outside the heating field so that it will remain cool and suitable for serving.

While the present invention is generally applicable to the melting of frozen liquids, it is particularly useful for melting frozen juices and for such melting in connection with dispensing apparatus.

While I have described particular embodiments of my invention, it will be apparent to those skilled in the art that changes and modifications may be made without departing from my invention in its broader aspects, and I aim, therefore, in dependent claims to cover all such changes and modifications as fall within the true spirit and scope of my invention.

What I claim as new and desire to secure by Letters Patent of the United States is:

1. The method of thawing frozen liquid which comprises placing the frozen liquid in an enclosure and subjecting it to a high frequency electromagnetic field to produce dielectric heating and progressive melting of the frozen liquid, and continually withdrawing the liquid from the enclosure subjected to the high frequency field as it is produced by melting.

2. The method of thawing frozen liquid packaged in a volume of a container which comprises subjecting the volume of frozen liquid to a high frequency electromagnetic field to produce dielectric heating and progressive melting of the frozen liquid and continually withdrawing the liquid from the volume subjected to the high frequency field as it is produced by melting.

3. The method of melting a frozen liquid contained in one part of a two-part container which comprises supporting the container with said one part within an enclosure providing an electromagnetic shield and with the other part of the container extending below said enclosure in a field free region, subjecting the interior of the enclosure to a high frequency electromagnetic field to melt the frozen liquid, and continually draining the liquid formed by melting into the second part of the container.

4. Apparatus for melting a frozen liquid comprising an enclosure providing electromagnetic shielding, means coupling electromagnetic energy to the interior of said enclosure, and means defining at least one drainage passage in the floor of said enclosure having a dimension which is small compared to the wavelength of the high frequency electromagnetic energy to drain liquid from said enclosure as it is formed by the melting of the frozen liquid within said enclosure.

5. Apparatus according to claim 4 in which the wall opposite the floor is provided with an opening and an outwardly extending tubulation surrounding the opening and having a length greater than the transverse dimension thereof to permit the insertion of frozen liquid into said enclosure with a minimum loss of electromagnetic energy.

6. Apparatus for melting a frozen liquid comprising an enclosure providing electromagnetic shielding, means coupling electromagnetic energy to the interior of said enclosure, and means in the floor of said enclosure defining an opening for receiving a two-part container and supporting it with one part extending upwardly from the floor and the second part extending downwardly from the floor so that liquid from said one part drains by gravity to said second part of said container.

7. A two-part container of non-conducting material having a barrier intermediate its length dividing the container into two compartments, said barrier having a restricted passage therethrough, and electromagnetic shielding means formed in said barrier and surrounding the said restricted opening.

References Cited
UNITED STATES PATENTS
3,192,771 7/1965 Stearns _____ 99—192
3,219,460 11/1965 Brown _____ 99—192

FOREIGN PATENTS
921,748 3/1963 Great Britain.

OTHER REFERENCES
Tressler et al: The Freezing Preservation of Foods, AVI Pub. Co., N.Y., pp. 410, 435, 436, 437.

A. LOUIS MONACELL, *Primary Examiner.*

HYMAN LORD, *Examiner.*

M. VOET, *Assistant Examiner.*